United States Patent
Heinrich et al.

(10) Patent No.: US 8,218,009 B2
(45) Date of Patent: Jul. 10, 2012

(54) DETECTION AND CATEGORISATION OF POINTS OF LIGHT WITH A CAMERA IN A MOTOR VEHICLE ENVIRONMENT

(75) Inventors: Stefan Heinrich, Achern (DE); Thomas Fechner, Wasserburg (DE); Carlos Almeida, Reinheim (DE)

(73) Assignee: ADC Automotive Distance Control Systems GmbH, Lindau (DE)

( * ) Notice: Subject to any disclaimer, the term of this patent is extended or adjusted under 35 U.S.C. 154(b) by 539 days.

(21) Appl. No.: 12/311,634

(22) PCT Filed: Sep. 27, 2007

(86) PCT No.: PCT/DE2007/001743
§ 371 (c)(1),
(2), (4) Date: Apr. 6, 2009

(87) PCT Pub. No.: WO2008/064621
PCT Pub. Date: Jun. 5, 2008

(65) Prior Publication Data
US 2010/0026806 A1  Feb. 4, 2010

(30) Foreign Application Priority Data
Nov. 27, 2006  (DE) .......................... 10 2006 055 904

(51) Int. Cl.
*H04N 7/18*  (2006.01)
(52) U.S. Cl. ....................................................... 348/148
(58) Field of Classification Search .................. None
See application file for complete search history.

(56) References Cited

U.S. PATENT DOCUMENTS

| | | | |
|---|---|---|---|
| 4,891,559 A | | 1/1990 | Matsumoto et al. |
| 5,798,786 A | * | 8/1998 | Lareau et al. ................. 348/144 |
| 5,837,994 A | | 11/1998 | Stam et al. |
| 5,990,469 A | | 11/1999 | Bechtel et al. |
| 6,044,166 A | | 3/2000 | Bassman et al. |
| 2002/0040962 A1 | | 4/2002 | Schofield et al. |
| 2002/0195949 A1 | | 12/2002 | Stam et al. |
| 2004/0143380 A1 | | 7/2004 | Stam et al. |
| 2006/0177098 A1 | * | 8/2006 | Stam ............................ 382/104 |

(Continued)

FOREIGN PATENT DOCUMENTS

DE  198 20 348  11/1999

(Continued)

OTHER PUBLICATIONS

Japanese Office Action in Japanese Pat. App. No. 2009-540587, mailed Aug. 2, 2011 (4 pages), with partial English translation (1 page).

*Primary Examiner* — Ario Etienne
*Assistant Examiner* — Clayton R Williams
(74) *Attorney, Agent, or Firm* — W. F. Fasse (57) ABSTRACT

A method for detecting and categorizing points of light for a motor vehicle with a camera sensor directed towards the motor vehicle environment is presented. Here, at least one first category for passive, illumined reflectors and at least one second category for self-radiating, moving lights, in particular motor vehicle lights, is provided. For this purpose, the time progression of the intensity of a point of light is analysed. On the basis of the intensity fluctuation, points of light are categorized as motor vehicle lights or as reflectors.

22 Claims, 4 Drawing Sheets

U.S. PATENT DOCUMENTS

2008/0165028 A1 7/2008 Fechner et al.

FOREIGN PATENT DOCUMENTS

| DE | 103 36 329 | 3/2005 |
| --- | --- | --- |
| DE | 102004060461 | 7/2006 |
| DE | 102006004770 | 5/2007 |
| DE | 102006055906 | 6/2007 |
| JP | 61-285153 | 12/1986 |
| JP | 06-076047 | 3/1994 |
| JP | 08-166221 | 6/1996 |
| JP | 10-512694 | 12/1998 |
| WO | WO 2004/034183 | 4/2004 |
| WO | WO 2006/089498 | 8/2006 |

* cited by examiner

DETECTION AND CATEGORISATION OF POINTS OF LIGHT WITH A CAMERA IN A MOTOR VEHICLE ENVIRONMENT

FIELD OF THE INVENTION

The invention relates to a method for the detection of reflectors which are used e.g. to mark the roadway on the edge of the road, and motor vehicle headlights, with a camera sensor system in a motor vehicle environment. A method of this type can be used e.g. for the automatic full beam light control of motor vehicle headlights.

BACKGROUND INFORMATION

An automatic light control system based on a photosensor is described in the disclosure DE 19820348. For this purpose, a highly sensitive photosensor is provided in the motor vehicle which is directed forwards in the direction of travel. The headlights of an oncoming motor vehicle impact the photosensor when a motor vehicle is approaching, and the full beam light is switched off. When a sufficiently low level of light intensity is again detected by the photosensor, when the oncoming motor vehicle has passed the own motor vehicle and is outside the recording area of the photosensor, the full beam light is switched back on again.

With this very simple method, only the light intensity is measured and the type of "light source", such as ambient light, reflectors, motor vehicle headlights, or street lighting, is not classified. This can lead to a dysfunction in the lighting control system.

SUMMARY OF THE INVENTION

The object of the invention is therefore to provide a reliable method for the detection of reflectors, in particular, those which are used to mark the roadway on the edge of the road, and motor vehicle headlights, with a camera sensor system in a motor vehicle environment.

This object is attained according to the invention by means of a method according to the independent patent claims. Advantageous further embodiments are described in the sub-claims.

A method for the detection and categorisation of points of light with a camera sensor in a motor vehicle environment is presented. At least one first category for illumined reflectors, in particular stationary reflectors, traffic signs etc., and at least one second category for motor vehicle lights is provided. With a camera sensor, an image sequence of the motor vehicle environment is recorded. When one or more point(s) of light are present, at least one point of light is pursued (tracked) in the image sequence. The intensity of a pursued point of light is determined in at least two images, and the intensity fluctuation is analysed. Points of light with a comparatively high time-related intensity fluctuation are categorised as motor vehicle lights, and points of light with a comparatively low time-related intensity fluctuation are categorised as reflectors.

Here, luminous objects of all shapes are identified as points of light. In a preferred embodiment of the invention, only those shapes are taken into account which correspond to the shapes of reflectors or motor vehicle lights (round, rectangular, etc.).

In an advantageous embodiment of the invention, the variance or standard deviation or the stroke are calculated in order to analyse the time-related intensity fluctuation of a pursued point of light.

In a particular embodiment of the method according to the invention, the variance or standard deviation of the intensity in relation to a continuous average value is calculated. This procedure is advantageous, since the intensity of a point of light depends on the distance, which also usually changes continuously with a moving motor vehicle with a camera sensor.

Alternatively, in a particular embodiment of the invention, the variance or average value is calculated with reference to a modelled progression of the average value. The modelled progression can for example be a linear or polygonal interpolation of the measured values to date.

In an advantageous embodiment of the invention, the progression of the intensity of points of light in the image is analysed. For example, the distance-dependent intensity can be used for this purpose. With a reflector, the intensity is proportionate to $1/x^4$, wherein x is the distance between the reflector and the motor vehicle. The distance-dependent intensity with an active light source is by contrast proportionate to $1/x^2$. A distance estimation of the point of light can be achieved with the camera.

An alternative embodiment of the method detects a point of light with an intensity above a first threshold value as motor vehicle lights and a point of light with an intensity below a second threshold value as a reflector. The basic principle underlying this embodiment is that motor vehicle headlights of an oncoming motor vehicle appear brighter in the image than reflectors which reflect the headlight of the own motor vehicle. Accordingly, points of light with an intensity above an upper threshold value are clearly caused by a headlight. A similar argument can be made for a lower threshold value.

In an advantageous embodiment of the method according to the invention, the movement of at least one point of light is analysed in an image sequence. The anticipated movement of a stationary object can be calculated from the motor vehicle's own movement, which is determined e.g. with speed and yaw rate measurements. If the movement of the pursued point of light deviates from the anticipated movement for a stationary point of light, the point of light is classified as being moving. In a further embodiment of the invention, the corresponding distance of the point of light is determined. For this purpose, a sensor is provided in or on the motor vehicle, which determines the distance between at least one point of light and the motor vehicle which is equipped with a camera.

In a further embodiment of the invention, the pitch angle of the motor vehicle is determined. With a movement analysis of the points of light, the interference is caused by a pitch movement of the motor vehicle is extracted. The pitch movement is not usually taken into account when evaluating the direction of movement of a light source as described above, since it cannot simply be measured by sensors. In an advantageous embodiment of the invention, the pitch movement is determined indirectly by analysing the image data from the motor vehicle environment.

BRIEF DESCRIPTION OF THE DRAWINGS

The invention will now be explained in greater detail below with reference to exemplary embodiments and drawings, in which.

DETAILED DESCRIPTION OF EXAMPLE EMBODIMENTS OF THE INVENTION

All the features described here can contribute individually or in any combination required to the invention. No time progression for the method stages is of necessity specified by the sequence selected here.

Selection of a Suitable Image Section

In an exemplary embodiment of the invention, image sections (windows) are determined in which a search is made for motor vehicles. As a result of the window processing, the image processing complexity is significantly reduced, since it is no longer necessary to search the entire image for motor vehicles. Furthermore, when the lane is known, the window can be positioned onto the anticipated lane in such a manner that erroneous detections of objects on the side of the road are reduced. The size of the window is selected in such a manner that the motor vehicle objects being searched for fit in. An edge area is added which increases in size, the less precise the knowledge regarding the anticipated motor vehicle position is. The vertical position, width and height of the search window is positioned according to a distance hypothesis from the knowledge of the camera image equation (see section-Analysis of the movement of points of light in the image). The horizontal positioning of the window is achieved due to the knowledge of the progression of the lane in front of the motor vehicle from a preceding lane determination by means of image processing. This data is made available e.g. by a lane departure warning system which is integrated into the motor vehicle, a passenger assistance system (ACC), a digital card and satellite-supported position determination (e.g. from a navigation system), or from a route estimation which is achieved using inertial sensors.

Analysis of the Intensity of Points of Light

I) Analysis of the Time-Related Intensity Fluctuations of Points of Light

Figure 1:
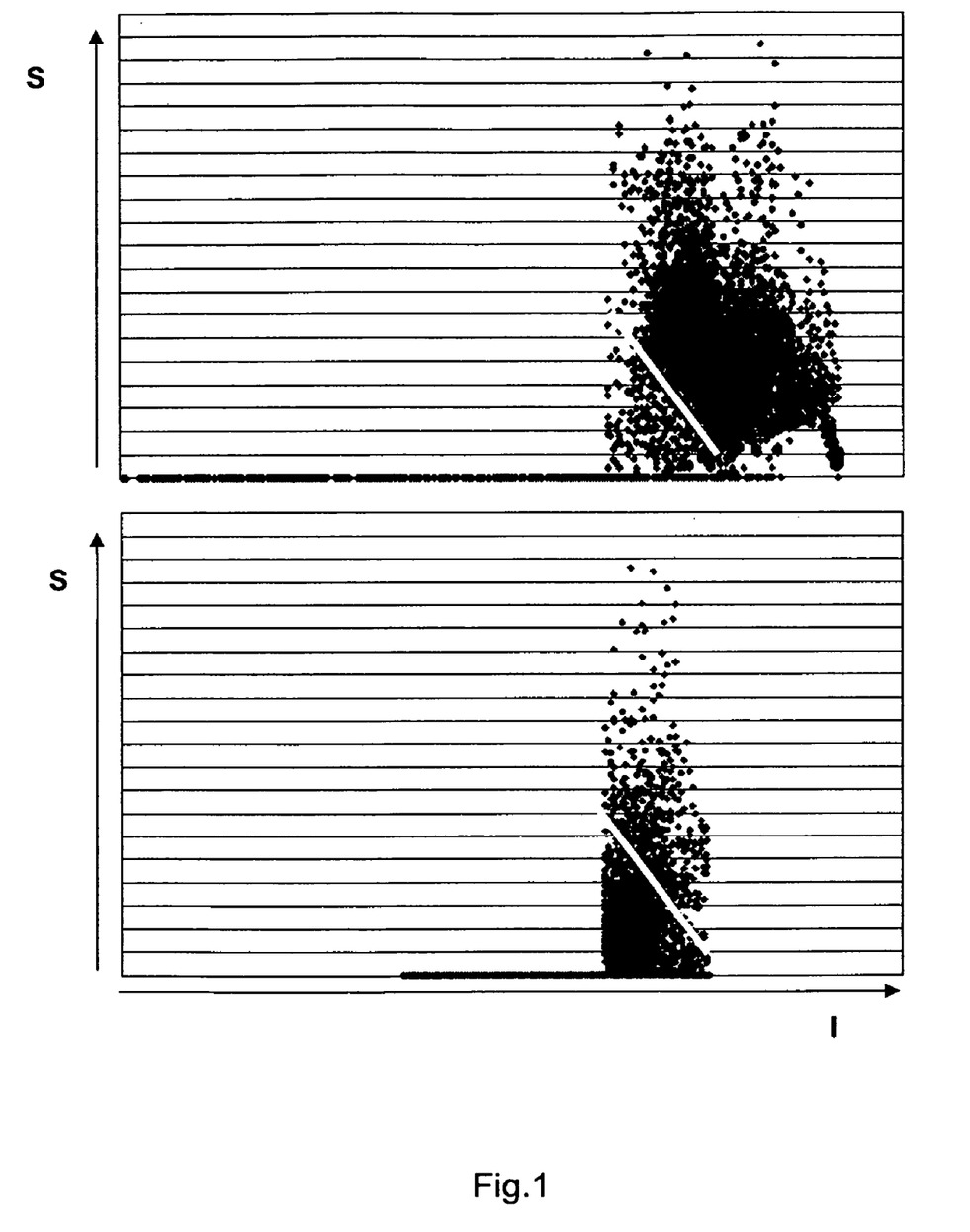
FIG. 1 shows the intensity fluctuation S applied over the intensity I for oncoming front headlights (above) and reflectors (below) in a specified intensity range

If a point of light is detected, it is pursued (tracked) in the succession of images. The intensity of a pursued point of light is determined in a large number of images, and the intensity progression is analyzed. Here, the fluctuation of the intensity around an average value is of particular interest. Since the intensity of a point of light depends on the distance which usually constantly changes in a moved motor vehicle with the camera, a continuous average value is used to determine the intensity fluctuation. An alternative method of showing the intensity fluctuation is to determine the swing or range of successive measurement values. In the top part of FIG. 1, the intensity fluctuation is applied for oncoming light sources, and in the bottom part of FIG. 1, for reflectors in a specified intensity range. It can immediately be seen that the determined intensity fluctuation in the specified intensity range is on average significantly higher for the headlight of an oncoming motor vehicle than the intensity fluctuation for a reflector. In both drawings, FIG. 1 top and FIG. 1 bottom, the same white line is drawn for clarification purposes. In FIG. 1 top (oncoming motor vehicle headlights), there is a clear predominance of intensity fluctuation above the line, while in FIG. 1 bottom (reflectors marking the roadway), the clear predominance of variance values is arranged below the line. The cause of the different behavior of the variance is the specific reflection characteristics of reflectors which reflect back the light in the direction from which it has come. Since headlights and camera sensors in a motor vehicle are both subject to the same inherent movement of their own motor vehicle, the incident angle of the reflected light onto the camera chip, and thus the intensity of the point of light, is comparatively constant. If a light source is present, at least the own subject motor vehicle which carries the camera has its own movement, such as a pitch movement. The incident angle of the incident light from the light source onto the camera chip and thus the intensity of the point of light in the image has a comparatively low constancy. This property is used to differentiate between a reflector and a self-radiating light source. Points of light of which the intensity fluctuation values are arranged predominantly below the boundary line are classified as reflectors. Points of light of which the intensity fluctuation values lie predominantly above the line are recognized as self-radiating points of light. The progression of such a boundary line can be firmly specified in a data processing program. An alternative is to adapt the progression of the boundary line to measured values which have previously been recorded. For this purpose, the variance values of the points of light and their classification (reflector, self-radiating light source) are regarded retrospectively, but also in a predictive manner. The classification can be made with the aid of the variance criterion and/or other methods. The boundary line is thus calculated in such a manner that as few variance values as possible from the reflectors lie above the line, and as few variance values as possible from self-radiating light sources lie below the line.

II) Analysis of the Absolute Intensity of Points of Light

Figure 2:
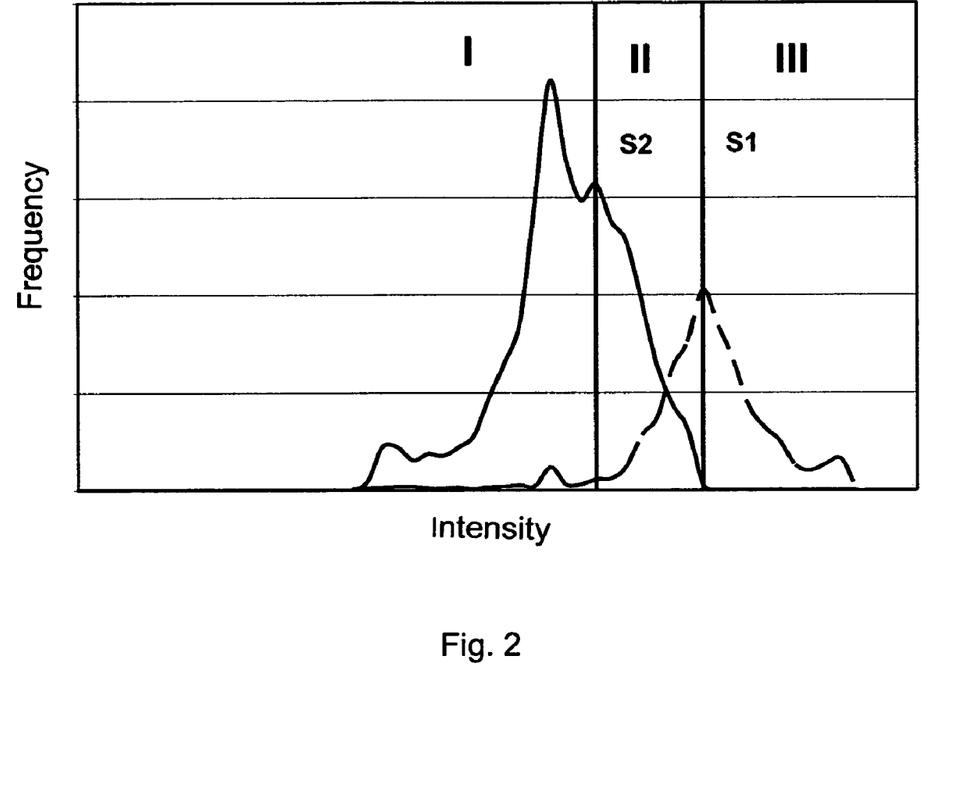
FIG. 2 shows the schematic frequency distribution of the intensity of reflectors and motor vehicle lights

The intensity of the light of the motor vehicle's own headlights which is reflected back from reflectors is proportionate to $1/x^4$, wherein x indicates the distance between the reflector and the motor vehicle. By contrast, the intensity of self-radiating light sources, usually motor vehicle headlights, is proportionate to $1/x^2$. In other words, at the same distance, motor vehicle headlights of an oncoming motor vehicle are shown as being brighter in the image than reflectors which reflect the headlight light of their own motor vehicle. A typical frequency distribution over the intensity is shown in FIG. 2. The frequency distribution of self-radiating light sources is shown with a broken line, and that of reflectors is shown with an unbroken or solid line. It can clearly be seen that the frequency distributions are offset from each other. In the drawing, three intensity ranges can be identified. In the low intensity range marked I, only reflectors are shown, in the middle intensity range marked II, reflectors and self-radiating light sources are shown, and in the high intensity range marked III, only self-radiating light sources are shown. Accordingly, points of light with an intensity above an upper threshold value S1 are caused by a headlight. Points of light with an intensity below a lower threshold value S2 are caused to a high degree of probability by a reflector. If a point of light has an intensity which lies between the two threshold values S1 and S2, no statement can be made with this method as to whether a reflector or a self-radiating light source is present.

III) Analysis of the Intensity Gradient

Furthermore, the intensity progression of the at least one point of light is recorded. The intensity of the light from the motor vehicle's own headlights which is reflected back from reflectors is proportionate to $1/x^4$, wherein x indicates the distance between the reflector and the motor vehicle. In other words, based on the time intensity progression, a point of light can be classified as a passive light source (reflector) or as an active, self-radiating light source. This assignment is verified in a preferred embodiment of the invention on the basis of the determined distance of the point of light and the knowledge of the luminance of the motor vehicle's own headlights and the reflection properties of standard reflectors on the edge of the road. In one embodiment of the invention, the distance determination is used in order to determine a predicted or probable intensity progression for a passive and an active light source, and to be used for verification purposes as to whether a reflector or an active light source is present. Equally, in a preferred embodiment of the invention, the intensity of the measured point of light is compared with the anticipated intensity of a front headlight or of a tail light of the standard luminance at the determined distance. The same prediction is made for standard reflectors in the determined distance, assuming the radiance from the motor vehicle's own front headlights. The calculated values are used to verify whether a reflector or an active light, source (motor vehicle lights) are present.

In the method presented here, a point of light is identified as a reflector when the time/location progression of the movement of the point of light essentially conforms to the behavior of an object which is stationary relative to the roadway, and the time progression of the intensity essentially corresponds to the anticipated progression for a passive light source. Furthermore, a point of light is identified as a motor vehicle light when the time progression of the movement of the point of light essentially conforms to the behavior of an object which moves relative to the roadway, and the time progression of the intensity essentially corresponds to the anticipated progression for an active light source.

Analysis of the Movement of Points of Light in the Image

I) Image Flow

In order to detect motor vehicle lights, the optical flow of bright, punctiform image objects is determined which are extracted using known image processing methods (correlation, morphological filtering, region segmentation). If the image flow of these image objects is in tune with the motor vehicle's own movement (speed, yaw), it can be assumed that stationary points of light are present. For this purpose, the hypothetical image flow for stationary image points is determined at different distances and is compared with the actual image of the points of light which have been extracted from the current image. If the image flow of said points of light is essentially dominated by the known movement (speed, yaw), these points of light are stationary. If none of the hypotheses for the measured image flow of a point of light applies, the point of light must be a moving light. With the differentiation, the approximate knowledge of the distance between the points of light shown and the motor vehicle is useful, since the image flow depends on the distance of the points of light as well as the own movement of the camera motor vehicle and the possible movement of the points of light. Objects at close range have a stronger image flow than objects located at a distance.

One method of determining the distance of a point or object d with a monocular camera is shown. The distance to the monocular camera is determined from h the camera installation height, $\alpha$ the camera pitch angle, y the image line of the point, $\eta$ the pixel size and f the focal length of the camera $$d = h \cdot \frac{1 - t \cdot \tan\alpha}{t + \tan\alpha} \text{ with } t = y \cdot \frac{\eta}{f}$$

If the forenamed parameters are therefore known following an adjustment of the direction of view of the camera, the distance d can be determined.

II) Fault Caused by the Pitch Movement of the Own Motor Vehicle

A problem which frequently arises when evaluating the direction of movement of a light source is the swaying of the body of the own motor vehicle and thus of the camera. This causes the image flow of objects to be influenced not only by the speed and yaw of the camera motor vehicle, but also by the rotational movement of the body relative to the roadway surface, the pitch movement of the motor vehicle. In contrast to the speed and yaw, the pitch movement cannot simply be measured by sensors. This fault occurs to a greater extent when the roadway surface is uneven, and during longitudinal acceleration (in a positive and negative direction). Regardless of how well the chassis of the camera motor vehicle is able to dampen the forces which are created during this process, faults are always present due to pitch movements.

Figure 3:
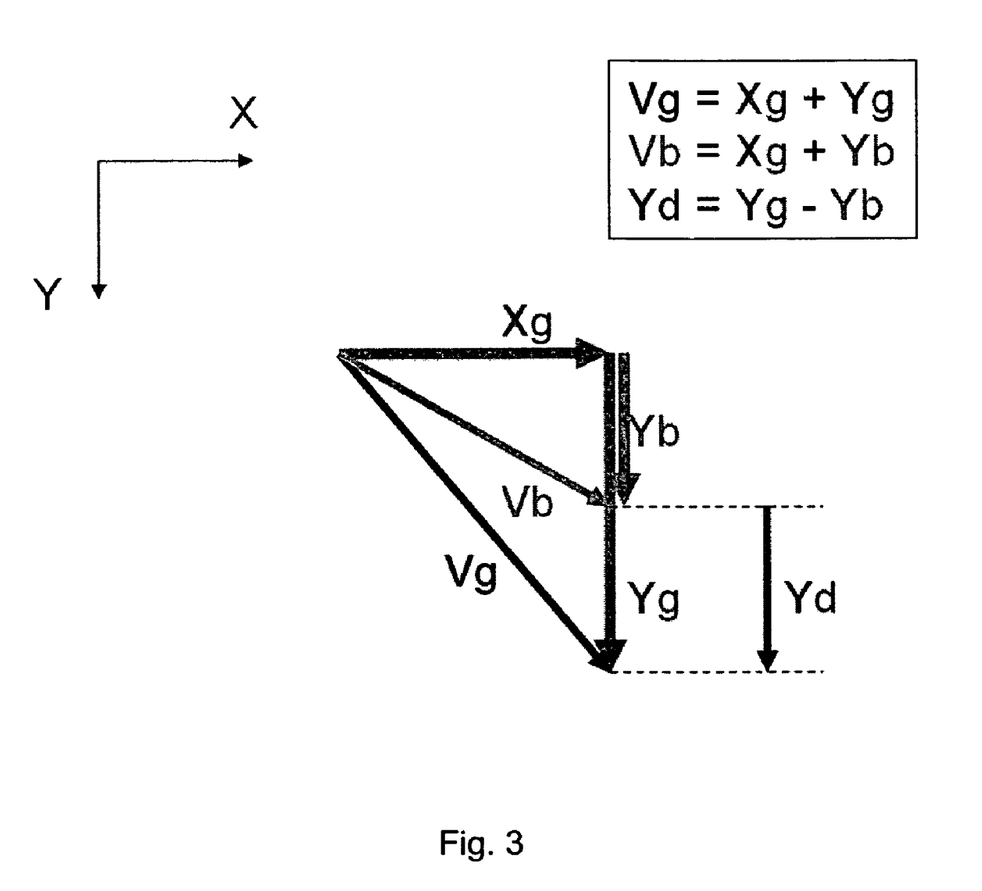
FIG. 3 shows the pitch movement

In the following, an option is presented for determining the pitch movement in order to enable a subsequent compensation. For this purpose, the camera images themselves are analysed. If the chassis dips forward, the camera inclines downwards and all points in the video image are displaced upwards accordingly; conversely, the points move downwards when the motor vehicle body springs back again. Use can now be made of the fact that this movement is the same in the video image for all points, and only occurs in a vertical direction, i.e. the horizontal movement component of the image points remains uninfluenced by the pitch movement of the camera. On the assumption that a stationary object is present with an image point under consideration, the distance between this point and the camera can be calculated from its position in the image, known speed and yaw of the camera motor vehicle, as well as solely from its horizontal displacement. A determination can be made e.g. on the basis of the analysis of the intensity in an image sequence as to whether the object is stationary or moving. If the distance of the point from the horizontal displacement is known, the associated vertical displacement can therefore be determined in turn. Since the horizontal displacement of the point, as explained above, is independent of the pitch movement, this now also applies to the determined corresponding vertical displacement. If the displacement measured in the video image is interfered with by the pitch movement of the camera, this is detected due to a difference between the measured and the calculated vertical displacement. With the determined pitch movement, the corresponding image data can now be corrected. In FIG. 3, the determination of the pitch angle is shown schematically as a vector diagram. Vg represents the overall displacement of an object measured in the image. This vector can be divided into the measured overall displacement in the X direction Xg and in the Y direction Yg. Yb refers to the calculated displacement in the Y direction, which, as was explained above, has been calculated for a stationary object. Yd gives the precise difference between the calculated and the measured displacement in the Y direction, and thus also the influence of the pitch movement.

Method for Analysing Points of Light

Figure 4:
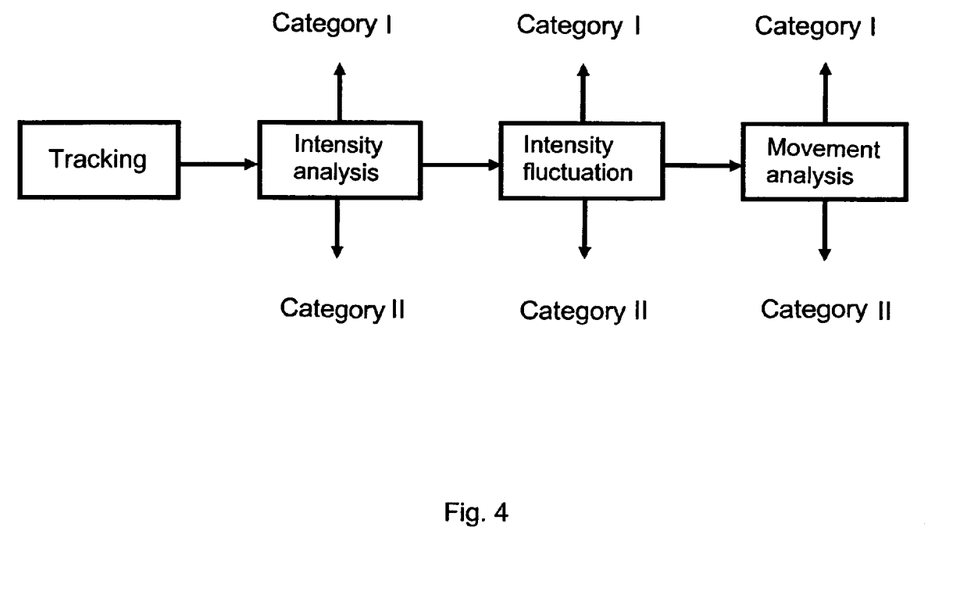
FIG. 4 shows a flow chart of the method

FIG. 4 shows a flow chart which illustrates an advantageous method for analysing and categorising points of light. Here, category I is assigned to reflectors, and category II is assigned to self-radiating, moving lights (motor vehicle lights). Initially, the points of light are pursued (tracked) in the camera images. Then, the time progression of the intensity of the points of light is subjected to an intensity analysis. This can include an analysis of the intensity progression and/or the absolute intensity. If a clear assignment of points of light to categories I or II is possible, the categorisation is complete. If no assignment is possible, in a further stage, the intensity fluctuation of points of light is examined. If no clear assignment of a point of light to category I or II is possible here, a movement analysis is conducted in a further stage. On the basis of the movement analysis and possibly of the analysis stages conducted previously, a decision is made as to whether the points of light under examination can be assigned to category I or II.

The invention claimed is:

1. A method for detecting and categorizing points of light for a subject motor vehicle with a camera sensor directed toward the motor vehicle environment around the subject motor vehicle, which provides at least one first category for stationary, illuminated reflectors used to mark an edge of a roadway, and at least one second category for self-radiating, moving, motor vehicle lights of other motor vehicles, comprising the steps:
   recording an image sequence of the motor vehicle environment;
   tracking at least one point of light in the image sequence;
   determining a varying intensity of the point of light in at least two images of the image sequence, and analyzing a time progression of the intensity as an intensity fluctuation, and
   categorizing a point of light with a comparatively high intensity fluctuation as a motor vehicle light, and categorizing a point of light with a comparatively low intensity fluctuation as a reflector.

2. The method for detecting and categorizing points of light according to claim 1, wherein, in order to analyze the intensity fluctuation of a point of light, the variance or standard deviation is calculated with reference to a continuous average value.

3. The method for detecting and categorizing points of light according to claim 1, wherein, in order to analyze the intensity fluctuation of a point of light, the swing range of consecutive measured values is calculated.

4. The method for detecting and categorizing points of light according to claim 1, further comprising analyzing an intensity of points of light in the image.

5. The method for detecting and categorizing points of light according to claim 4, wherein points of light with the intensity above a first threshold value are detected as the motor vehicle lights, and points of light with the intensity below a second threshold value are detected as the reflectors.

6. The method for detecting and categorizing points of light according to claim 1, further comprising analyzing a movement of the points of light in the image sequence, and taking into account the subject motor vehicle's own movement and/or a distance estimation of a selected point of light, the selected point of light is classified as being stationary or moving.

7. The method for detecting and categorizing points of light according to claim 1, further comprising analyzing a pitch angle of the subject motor vehicle and, with a movement analysis of the points of light, extracting an interference caused by a pitch movement of the subject motor vehicle.

8. A motor vehicle with a camera sensor and image data processing program implementing a method according to claim 1.

9. A motor vehicle with a camera sensor for a passenger assistance system, for recording a driving lane, and an image data processing program implementing a method according to claim 1.

10. The method for detecting and categorizing points of light according to claim 1, further comprising switching an illumination condition of headlights of the subject motor vehicle in response to and dependent on whether the point of light is categorized as the motor vehicle light or as the reflector.

11. A method of controlling a motor vehicle system of a subject motor vehicle that is equipped with a camera sensor and an image processor, wherein said camera sensor is arranged to monitor an environment outside of said motor vehicle, said image processor is connected and adapted to evaluate image data provided by said camera sensor, and said method comprises:
   a) with said camera sensor, acquiring an image sequence of successive images of said environment;
   b) in said image processor, respectively detecting and tracking at least one respective point of light in said successive images in said image sequence;
   c) in said image processor, determining a respective luminous intensity of said respective point of light, and determining a respective intensity fluctuation of said respective point of light as a fluctuation of said respective luminous intensity among said successive images in said image sequence;
   d) in said image processor, evaluating said respective intensity fluctuation as to whether said respective intensity fluctuation falls into a first category of comparatively high intensity fluctuations or a second category of comparatively low intensity fluctuations compared to said first category;
   e) in said image processor, in response to and dependent on at least a result of said evaluating, respectively identifying said respective point of light as a motor vehicle light of another motor vehicle in said environment if said respective intensity fluctuation was evaluated as falling into said first category of comparatively high intensity fluctuations, and respectively identifying said respective point of light as a stationary reflector in said environment if said respective intensity fluctuation was evaluated as falling into said second category of comparatively low intensity fluctuations; and
   f) in a controller of said subject motor vehicle, automatically controlling a motor vehicle system of said subject motor vehicle in response to and dependent on whether said respective point of light was identified as said motor vehicle light or as said stationary reflector.

12. The method according to claim 11, wherein said motor vehicle system comprises a lighting system including headlights of said subject motor vehicle, and said controlling comprises switching an illumination condition of said headlights.

13. The method according to claim 11, wherein said determining of said respective intensity fluctuation comprises comparing respective individual values of said respective luminous intensity, which were respectively determined individually in said successive images, to an average of said respective luminous intensity among said successive images to determine a variance or standard deviation of said individual values relative to said average.

14. The method according to claim 13, further comprising determining said average as a continuous moving average of successive ones of said individual values of said respective luminous intensity among said successive images.

15. The method according to claim 11, wherein said determining of said respective intensity fluctuation comprises determining a difference range of consecutive individual values of said respective luminous intensity, which were respectively determined individually in consecutive ones of said successive images.

16. The method according to claim 11, wherein said evaluating comprises comparing said respective intensity fluctuation to at least one threshold.

17. The method according to claim 16, further comprising determining said at least one threshold respectively as a function of intensity fluctuation relative to luminous intensity, ranging from higher values of intensity fluctuation at lower values of luminous intensity, to lower values of intensity fluctuation at higher values of luminous intensity.

18. The method according to claim 17, wherein said function is a linear function with a negative slope of intensity fluctuation relative to luminous intensity.

19. The method according to claim 16, further comprising establishing said at least one threshold to include a first threshold below most arising values of intensity fluctuation of all motor vehicle lights in said image sequence, and a second threshold above most arising values of intensity fluctuation of all stationary reflectors in said image sequence.

20. The method according to claim 19, wherein said first threshold and said second threshold are both defined by a single same threshold function.

21. The method according to claim 19, wherein said establishing of said first threshold and said second threshold comprises evaluating and categorizing past values of intensity fluctuation of prior points of light that were previously imaged.

22. The method according to claim 11,
further comprising, in said image processor, evaluating said respective luminous intensity with regard to a distance-dependent variation thereof, and ascertaining whether said distance-dependent variation more closely matches a first function $1/x^2$ or a second function $1/x^4$ wherein x is a distance from said camera sensor to an object in said environment appearing as said respective point of light in said successive images in said image sequence, and
wherein said identifying of said respective point of light is further in response to and dependent on a result of said ascertaining, wherein said respective point of light is identified as said motor vehicle light if said distance-dependent variation more closely matches said first function $1/x^2$ and said respective point of light is identified as said stationary reflector if said distance-dependent variation more closely matches said second function $1/x^4$.

* * * * *